United States Patent
Jiang et al.

(10) Patent No.: US 9,244,154 B2
(45) Date of Patent: Jan. 26, 2016

(54) SYSTEM AND METHOD FOR POSITIONING DEVICE UNDER TEST

(71) Applicant: Acer Incorporated, New Taipei (TW)

(72) Inventors: Shu-Yu Jiang, New Taipei (TW); Yung-Sen Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 18 days.

(21) Appl. No.: 14/134,829

(22) Filed: Dec. 19, 2013

(65) Prior Publication Data

US 2014/0187260 A1  Jul. 3, 2014

(30) Foreign Application Priority Data

Dec. 27, 2012 (TW) ............................. 101150415 A (51) Int. Cl.

| | | |
|---|---|---|
| *H04W 24/00* | (2009.01) | |
| *G01S 5/14* | (2006.01) | |
| *H04W 64/00* | (2009.01) | |
| *G01S 5/30* | (2006.01) | |

(52) U.S. Cl.
CPC ... *G01S 5/14* (2013.01); *G01S 5/30* (2013.01); *H04W 64/00* (2013.01)

(58) Field of Classification Search
USPC ............. 455/452.2, 456.1, 456.2, 456.3, 457, 455/11.1, 513, 67.11, 67.12–67.14
See application file for complete search history.

(56) References Cited

U.S. PATENT DOCUMENTS

| | | | | |
|---|---|---|---|---|
| 5,748,757 A * | 5/1998 | Kubli | ...................... | H04R 1/406 381/160 |
| 6,243,819 B1 * | 6/2001 | Jung | ......................... | G06F 1/26 713/300 |
| 7,592,956 B2 * | 9/2009 | McPherson et al. | .......... | 342/458 |
| 8,737,168 B2 * | 5/2014 | Somasundaram et al. | ..... | 367/127 |
| 8,938,201 B2 * | 1/2015 | Boulton | ...................... | 455/67.14 |
| 2002/0123352 A1 | 9/2002 | Vayanos et al. | | |
| 2003/0063589 A1 | 4/2003 | Haines et al. | | |
| 2003/0144007 A1 * | 7/2003 | Johansson et al. | ............ | 455/456 |
| 2004/0261473 A1 * | 12/2004 | Avganim | ............ | E05B 73/0082 70/58 |
| 2006/0148544 A1 * | 7/2006 | Kim | ...................... | G06F 1/1616 455/575.4 |
| 2006/0279919 A1 * | 12/2006 | Wang | .................... | G06F 1/1616 361/679.09 |
| 2008/0130599 A1 * | 6/2008 | Horikoshi et al. | ............ | 370/338 |

(Continued)

FOREIGN PATENT DOCUMENTS

| | | |
|---|---|---|
| CN | 101398476 | 4/2009 |
| CN | 101959129 | 1/2011 |
| JP | 2011-237333 | 11/2011 |
| KR | 10-2010-0078976 | 7/2010 |
| TW | 200946945 | 11/2009 |
| TW | 201118662 | 6/2011 |

OTHER PUBLICATIONS

European Search Report dated Jun. 26, 2014.

(Continued)

*Primary Examiner* — Dai A Phuong
(74) *Attorney, Agent, or Firm* — McClure, Qualey & Rodack, LLP (57) ABSTRACT

A positioning system includes at least one DUT (Device Under Test) and a mobile device. A wireless connection is established between the DUT and the mobile device. The mobile device is moved along a path which includes at least two different measurement positions. The mobile device measures a distance between the DUT and each of the measurement positions. Then, the mobile device obtains a target position, at which the DUT is located, according to the measurement positions and the distances.

20 Claims, 8 Drawing Sheets

(56) References Cited

U.S. PATENT DOCUMENTS

2008/0186683 A1* 8/2008 Ligtenberg ............ G06F 1/1679 361/726
2013/0150120 A1* 6/2013 Wu ........................ G06F 1/1626 455/556.1

OTHER PUBLICATIONS

English language translation of abstract of TW 200946945 (published Nov. 16, 2009).
English language translation of abstract of TW 201118662 (published Jun. 1, 2011).
English language translation of abstract of JP 2011-237333 (published Nov. 24, 2011).
Gu, Y., et al.; "A Survey of Indoor Positioning Systems for Wireless Personal Networks;" IEEE Communications Surveys & Tutorials; vol. 11; No. 1; First Quarter; Jan. 1, 2009.
Liu, H., et al.; "Survey of Wireless Indoor Positioning Techniques and Systems;" IEEE Transactions on Systems, Man, and Cybernetics-Part C: Applications and Reviews; vol. 37; No. 6; Nov. 1, 2007.
Medina, C., et al.; "Feasibility of Ultrasound Positioning based on Signal Strength;" 2012 International Conference on Indoor Positioning and Indoor Navigation; Nov. 13, 2012.

* cited by examiner

SYSTEM AND METHOD FOR POSITIONING DEVICE UNDER TEST

CROSS REFERENCE TO RELATED APPLICATIONS

This Application claims priority of Taiwan Patent Application No. 101150415 filed on Dec. 27, 2012, the entirety of which is incorporated by reference herein.

BACKGROUND OF THE INVENTION

1. Field of the Invention

The disclosure generally relates to a positioning system, and more particularly, relates to a positioning system by moving a mobile device to position a DUT (Device Under Test).

2. Description of the Related Art

With the progress of mobile communication technology, portable electronic devices, for example, portable computers, mobile phones, tablet computer, multimedia players, and other hybrid functional mobile devices, have become more common. To satisfy the demand of users, portable electronic devices usually can perform wireless communication functions. Some functions cover a large wireless communication area, for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area, for example, mobile phones using Wi-Fi, Bluetooth, and WiMAX (Worldwide Interoperability for Microwave Access) systems and using frequency bands of 2.4 GHz, 3.5 GHz, 5.2 GHz, and 5.8 GHz.

Nowadays, an IPS (Indoor Positioning System) can be used for positioning a human being or a portable electronic device. However, the IPS generally requires at least three reference points at each of which an antenna is located to position a DUT (Device Under Test) precisely. Generally, there is minimal space in a portable electronic device, and it is not easy to dispose three or more antennas therein. Accordingly, the applications of the IPS are limited in use.

BRIEF SUMMARY OF THE INVENTION

In one exemplary embodiment, the disclosure is directed to a positioning system, comprising: a DUT (Device Under Test), comprising a first wireless communication module; and a mobile device, comprising a second wireless communication module, a sensor, and a processor, wherein a wireless connection is established between the second wireless communication module and the first wireless communication module. The mobile device is moved along a path comprising at least three different measurement positions, the sensor detects a relative relationship between the measurement positions, the mobile device measures a distance between the DUT and each of the measurement positions, and the processor calculates a target position at which the DUT is located according to the measurement positions and the distances.

In another exemplary embodiment, the disclosure is directed to a method for positioning, comprising the steps of: establishing a wireless connection between a mobile device and a DUT (Device Under Test); moving the mobile device along a path which comprises at least three different measurement positions; measuring a distance between the DUT and each of the measurement positions by the mobile device; and calculating a target position at which the DUT is located according to the measurement positions and the distances by the mobile device.

In one exemplary embodiment, the disclosure is directed to a positioning system, comprising: a DUT (Device Under Test), comprising a first wireless communication module; and a mobile device, comprising a second wireless communication module, a sensor, and a processor, wherein the second wireless communication module comprises a first antenna and a second antenna, wherein a wireless connection is established between each of the first antenna and the second antenna of the second wireless communication module and the first wireless communication module. The mobile device is moved along a path comprising at least two different measurement positions, the sensor detects a relative relationship between the measurement positions, the mobile device uses the respective first and second antennas to measure a distance between the DUT and each of the measurement positions, and the processor calculates a target position at which the DUT is located according to the measurement positions and the distances.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures thereof in the invention are shown in detail as follows.

Figure 1:
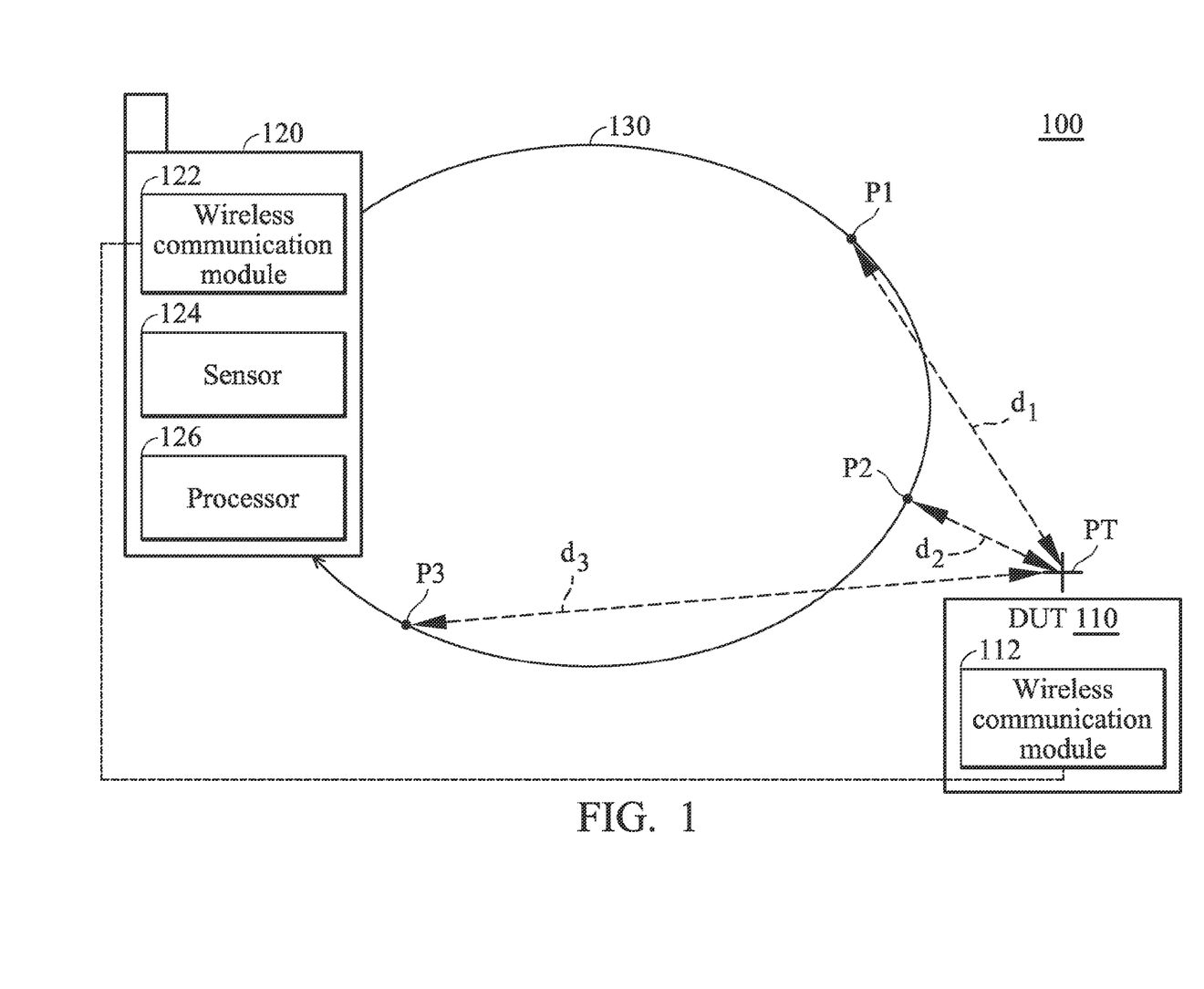
FIG. 1 is a diagram for illustrating a positioning system according to an embodiment of the invention.

FIG. 1 is a diagram for illustrating a positioning system 100 according to an embodiment of the invention. As shown in FIG. 1, the positioning system 100 comprises at least one DUT (Device Under Test) 110 and a mobile device 120. Any of the DUT 110 and the mobile device 120 may be a mobile phone, a tablet computer, a notebook computer, or any other electronic device with a function of wireless communication.

The DUT 110 comprises a wireless communication module 112. The mobile device 120 comprises a wireless communication module 122, a sensor 124, and a processor 126. Each of the wireless communication modules 112 and 122 comprises at least one antenna and a signal processing module (not shown). In a preferred embodiment, a wireless connection is established between the wireless communication module 122 of the mobile device 120 and the wireless communication module 112 of the DUT 110. For example, the wireless connection is a Wi-Fi connection, a Wi-Fi Direct connection, a 2G connection, a 3G connection, a WiMAX (Worldwide Interoperability for Microwave Access) connection, or an LTE (Long Term Evolution) connection. The mobile device 120 and the DUT 110 can transmit a variety of data to each other via the wireless connection. The sensor 124 may comprise a gyroscope, an electronic compass, and/or an accelerometer. In some embodiments, any of the DUT 110 and the mobile device 120 may further comprise other essential components, for example, a housing, a touch panel, a speaker, and a battery (not shown).

The mobile device 120 is configured to search for a target position PT at which the DUT 110 is located. The detailed procedure thereof will be illustrated as follows. To begin, the mobile device 120 is moved along a path 130, and the path 130 comprises at least three different measurement positions P1, P2, and P3. The measurement positions P1, P2, and P3 may be any three different points on the path 130. In some embodiments, the path 130 may substantially have a circular shape, an elliptic shape, or even an irregular shape. The sensor 124 is configured to detect the relative relationship between the measurement positions P1, P2 and P3. For example, on a coordinate plane, a coordinate of the measurement position P1 is ($x_1$, $y_1$), and a coordinate of the measurement position P2 is ($x_2$, $y_2$). When the mobile device 120 is moved from the measurement position P1 to the measurement position P2, the sensor 124 can detect the movement differences $\Delta x$ and $\Delta y$, where $\Delta x$ is equal to ($x_2-x_1$), and $\Delta y$ is equal to ($y_2-y_1$). During the period of movement, the mobile device 120 measures a distance $d_1$ between the DUT 110 and the measurement position P1, a distance $d_2$ between the DUT 110 and the measurement position P2, and a distance $d_3$ between the DUT 110 and the measurement position P3. Finally, the processor 126 of the mobile device 120 calculates the target position PT at which the DUT 110 is located according to the measurement positions P1, P2, and P3 and the distances $d_1$, $d_2$, and $d_3$.

Figure 2A:
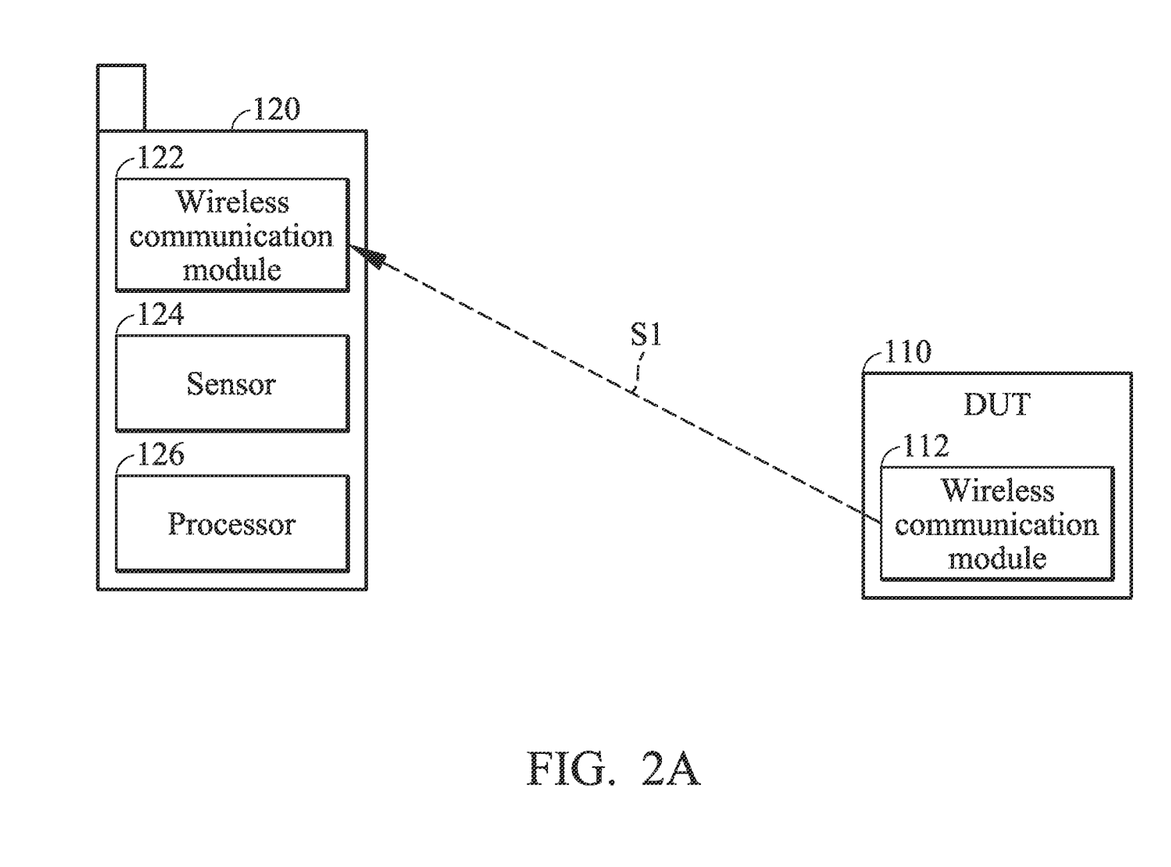
FIG. 2A is a diagram for illustrating a mobile device measuring a distance between itself and a DUT (Device Under Test) according to an embodiment of the invention.

FIG. 2A is a diagram for illustrating the mobile device 120 measuring a distance between itself and the DUT 110 according to an embodiment of the invention. In the embodiment, the mobile device 120 obtains an RSSI (Received Signal Strength Indication) S1 via the wireless connection (e.g., a Wi-Fi Direct connection) at each of the measurement positions P1, P2, and P3, and the processor 126 calculates the distances $d_1$, $d_2$, and $d_3$ according to the RSSIs S1.

Figure 2B:
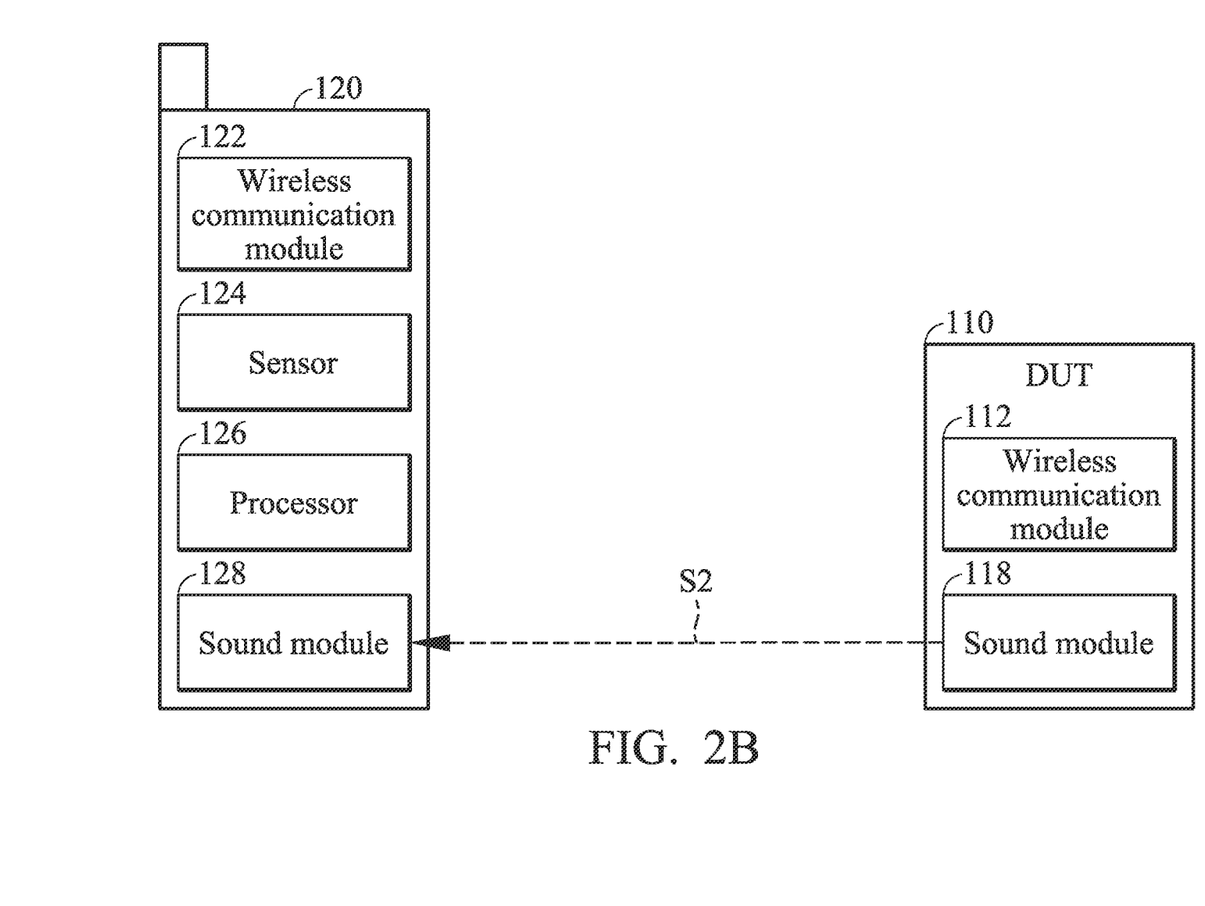
FIG. 2B is a diagram for illustrating a mobile device measuring a distance between itself and a DUT according to another embodiment of the invention.

FIG. 2B is a diagram for illustrating the mobile device 120 measuring a distance between itself and the DUT 110 according to another embodiment of the invention. In the embodiment, the DUT 110 further comprises a sound module 118, and the mobile device 120 further comprises another sound module 128, and the distances $d_1$, $d_2$, and $d_3$ are measured by transmitting sound signals S2 between the sound module 118 and the sound module 128. In some embodiments, the sound module 118 of the DUT 110 is a speaker, and the sound module 128 of the mobile device 120 is a microphone. The mobile device 120 receives a sound signal S2 from the DUT 110 at each of the measurement positions P1, P2, and P3. Then, the processor 126 of the mobile device 120 calculates the distances $d_1$, $d_2$, and $d_3$ according to the sound signals S2. The distances $d_1$, $d_2$, and $d_3$ may be measured according to attenuation of the sound signals S2.

Figure 3:
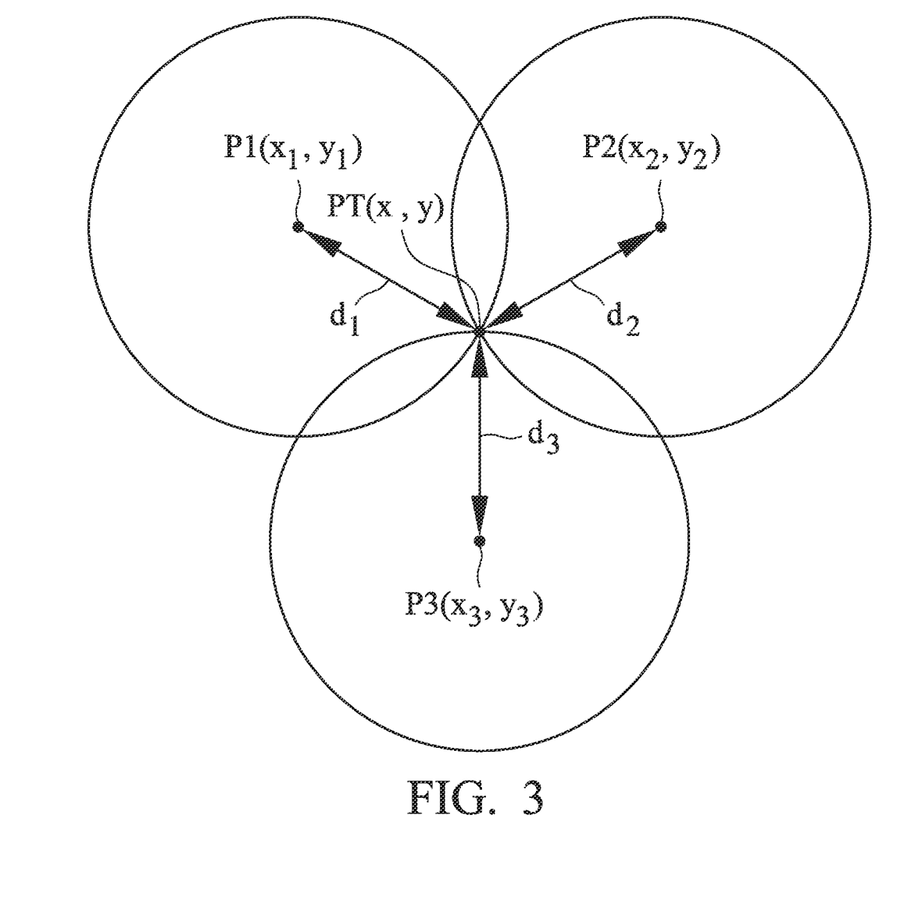
FIG. 3 is a diagram for illustrating how a positioning system calculates a target position according to an embodiment of the invention.

FIG. 3 is a diagram for illustrating how the positioning system 100 calculates the target position PT according to an embodiment of the invention. On a coordinate plane: (x, y) represents a coordinate of the target position PT at which the DUT 110 is located; ($x_1$, $y_1$) represents a coordinate of the measurement position P1; ($x_2$, $y_2$) represents a coordinate of the measurement position P2; ($x_3$, $y_3$) represents a coordinate of the measurement position P3; $d_1$ represents a distance between the measurement position P1 and the target position PT; $d_2$ represents a distance between the measurement position P2 and the target position PT; and $d_3$ represents a distance between the measurement position P3 and the target position PT. Note that the distance between the DUT 110 and any one measurement position is equivalent to the distance between the target position PT and the former measurement position. After the measurement positions P1, P2, and P3 and the distances $d_1$, $d_2$, and $d_3$ are obtained, the processor 126 of the mobile device 120 can calculate the coordinate (x, y) of the target position PT according to the following equation (1).

$$\begin{cases} (x-x_1)^2 + (y-y_1)^2 = d_1^2 \\ (x-x_2)^2 + (y-y_2)^2 = d_2^2 \\ (x-x_3)^2 + (y-y_3)^2 = d_3^2 \end{cases} \quad (1)$$

As shown in FIG. 3, the target position PT is located at an intersection of three circles. In some embodiments, the mobile device 120 may measure a distance between itself and the DUT 110 at each of four or more measurement positions to calculate the coordinate of the target position PT precisely. Note that the above all coordinates are relative coordinates. For example, the mobile device 120 may define the original measurement position P1 as an origin point (0, 0), and calculate a relative coordinate of the target position PT in response to the origin point.

Figure 4:
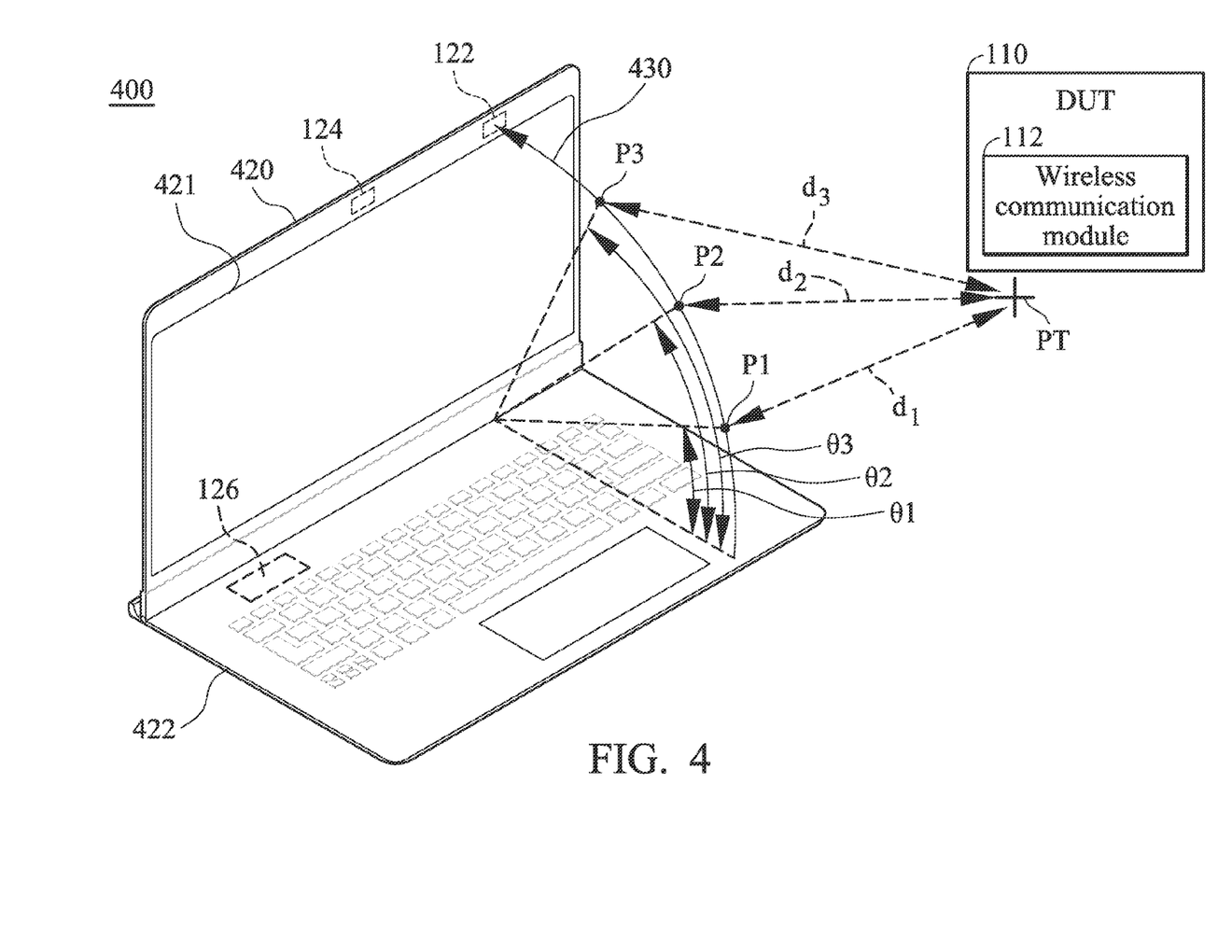
FIG. 4 is a diagram for illustrating a positioning system according to another embodiment of the invention.

FIG. 4 is a diagram for illustrating a positioning system 400 according to another embodiment of the invention. As shown in FIG. 4, a mobile device 420 is a notebook computer. The notebook computer comprises an upper cover 421 and a lower cover 422. A wireless communication module 122 of the mobile device 420 is disposed in the upper cover 421. In the embodiment, while the notebook computer is being opened and the wireless communication module 122 is being moved along a path 430 comprising at least three measurement positions P1, P2, and P3, the above distances $d_1$, $d_2$, and $d_3$ are measured. More particularly, when at least three different angles θ1, θ2, and θ3 are formed between the upper cover 421 and the lower cover 422, the distances $d_1$, $d_2$, and $d_3$ are measured, respectively. For example, when the angle θ1 is formed between the upper cover 421 and the lower cover 422, the mobile device 420 measures the distance $d_1$ between the DUT 110 and the measurement position P1. When the angle θ2 is formed between the upper cover 421 and the lower cover 422, the mobile device 420 measures the distance $d_2$ between the DUT 110 and the measurement position P2. When the angle θ3 is formed between the upper cover 421 and the lower cover 422, the mobile device 420 measures the distance $d_3$ between the DUT 110 and the measurement position P3. In some embodiments, the angles θ1, θ2, and θ3 are 30, 60, and 90 degrees, respectively. In other embodiments, the mobile device 420 may comprise two or more wireless communication modules disposed in the upper cover 421. When the mobile device 420 comprises two wireless communication modules 122 disposed at different positions (e.g., disposed at two opposite edges of the upper cover 421, respectively), the wireless communication modules 122 may be used merely at two measurement positions P1 and P2 to measure the DUT 110 to obtain four distances and four measurement positions, and accordingly, the target position PT can be calculated. Other features of the embodiment of FIG. 4 are similar to those of the above embodiments. Accordingly, these embodiments can achieve similar performances.

Figure 5:
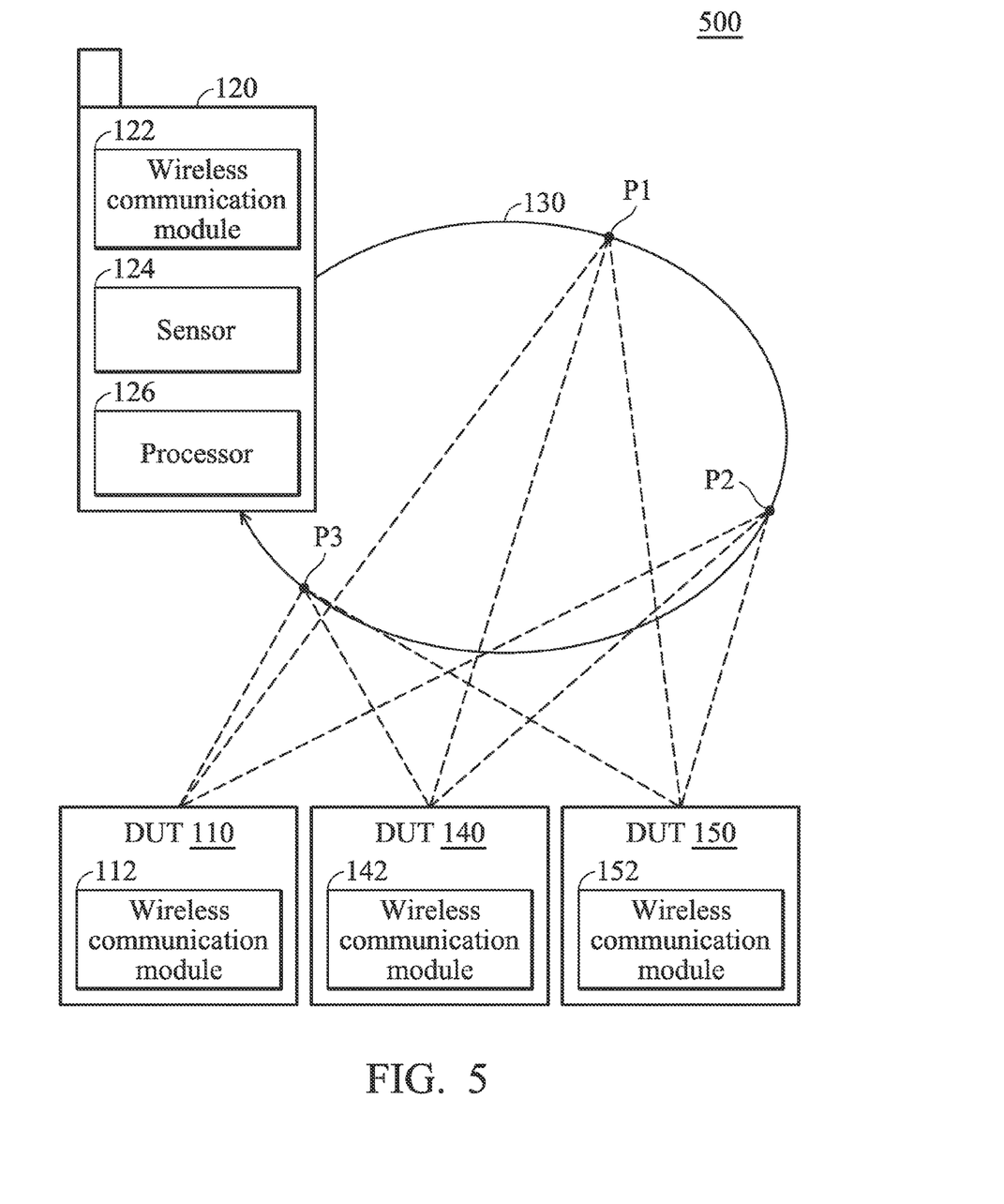
FIG. 5 is a diagram for illustrating a positioning system according to an embodiment of the invention.

FIG. 5 is a diagram for illustrating a positioning system 400 according to an embodiment of the invention. FIG. 5 is similar to FIG. 1. The difference between the two embodiments is that the positioning system 500 comprises three or more DUTs 110, 140, and 150. When the mobile device 120 is moved along the path 130, the mobile device 120 can detect respective distances from the measurement positions P1, P2 and P3 to the DUTs 110, 140 and 150, and accordingly calculate the target positions of the DUTs 110, 140, and 150. For example, the mobile device 120 and the DUTs 110, 140, and 150 are four mobile phones. When four users want to play a wireless poker game via these mobile phones, it is merely required to move one mobile phone to obtain relative positions of the other mobile phones. Other features of the embodiment of FIG. 5 are similar to those of the above embodiments. Accordingly, these embodiments can achieve similar performances.

Figure 6:
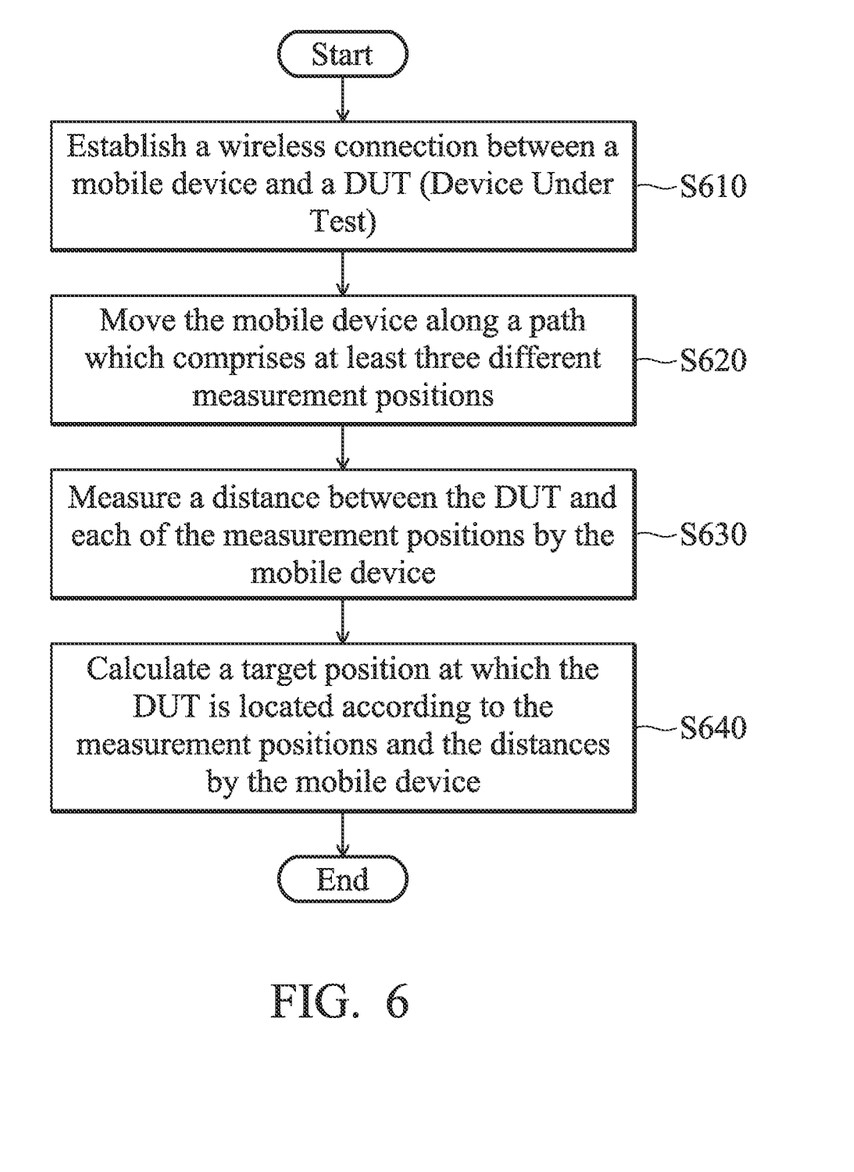
FIG. 6 is a flowchart for illustrating a method for positioning according to an embodiment of the invention.

FIG. 6 is a flowchart for illustrating a method for positioning according to an embodiment of the invention. To begin, in step S610, a wireless connection between a mobile device and a DUT (Device Under Test) is established. Next, in step S620, the mobile device is moved along a path which comprises at least three different measurement positions. In step S630, a distance between the DUT and each of the measurement positions is measured by the mobile device. Finally, in step S640, a target position at which the DUT is located is calculated by the mobile device according to the measurement positions and the distances. Other features of the embodiment of FIG. 6 are similar to those of the above embodiments. Accordingly, these embodiments can achieve similar performances.

Figure 7:
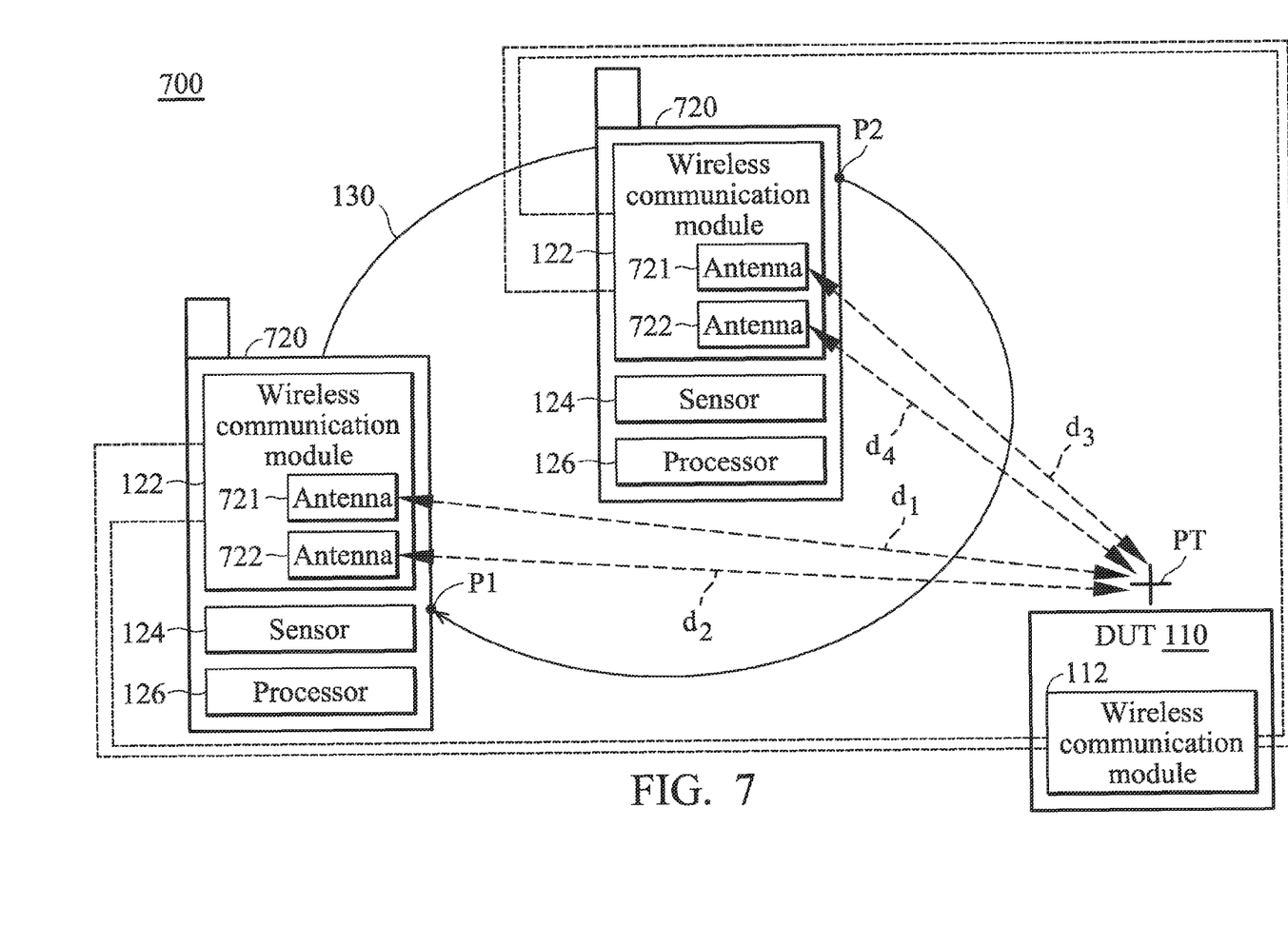
FIG. 7 is a diagram for illustrating a positioning system according to another embodiment of the invention.

FIG. 7 is a diagram for illustrating a positioning system 700 according to another embodiment of the invention. FIG. 7 is similar to FIG. 1. The difference between the two embodiments is that a wireless communication module 122 of a mobile device 720 of the positioning system 700 comprises two antennas 721 and 722. There is a predetermined distance between the antennas 721 and 722. The wireless communication module 122 may further comprise a signal processing module (not shown). A wireless connection is established between each of the antennas 721 and 722 of the wireless communication module 122 and the wireless communication module 112 of the DUT 110. In the embodiments, the mobile device 720 is moved along a path 130, and the path 130 comprises at least two different measurement positions P1 and P2. The mobile device 720 uses the respective antennas 721 and 722 of the wireless communication module 122 to measure a distance between the DUT 110 and each of the measurement positions P1 and P2. In some embodiments, the mobile device 720 obtains two RSSIs (Received Signal Strength Indications) via the wireless connection at each of the measurement positions P1 and P2. Since the two antennas 721 and 722 are used at the same time, the mobile device 720 can obtain two distances at each of the measurement positions P1 and P2. For example, at the measurement position P1, a distance $d_1$ between the antenna 721 and the DUT 110, and a distance $d_2$ between the antenna 722 and the DUT 110 may be obtained at the same time; and at the measurement position P2, a distance $d_3$ between the antenna 721 and the DUT 110, and a distance $d_4$ between the antenna 722 and the DUT 110 may be obtained at the same time. In the embodiment, the mobile device 720 can merely measure at two measurement positions P1 and P2, but can still use the equation (1) to position the DUT 110. In other embodiments, the mobile device 720 may further comprise another wireless communication module. The antennas 721 and 722 may be respectively disposed in the two wireless communication modules. Each of the two wireless communication modules may further comprise a signal processing module.

The mobile device 720 of FIG. 7 may be applied to the notebook computer of FIG. 4. With the antennas 721 and 722 of the wireless communication module 122 disposed in the upper cover 421, when at least two different angles are formed between the upper cover 421 and the lower cover 422, the distances $d_1$, $d_2$, $d_3$, and $d_4$ may be measured, respectively. Other features of the embodiment of FIG. 7 are similar to those of the above embodiments. Accordingly, these embodiments can achieve similar performances.

It is deemed that the invention disposes at least three virtual antennas at a plurality of measurement positions, respectively. Accordingly, a triangular positioning method can be used to obtain a target position at which a DUT is located. The mobile device of the invention merely requires one or two wireless communication modules to position a DUT. The invention not only reduces the costs of a positioning system but also increases the convenience in use.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A positioning system, comprising:
    a DUT (Device Under Test), comprising a first wireless communication module; and
    a mobile device, comprising a second wireless communication module, a sensor, and a processor,
    wherein a wireless connection is established between the second wireless communication module and the first wireless communication module, and
    wherein the mobile device is moved along a path comprising at least three different measurement positions, the sensor detects a relative relationship between the measurement positions, the mobile device measures a distance between the DUT and each of the measurement positions, and the processor calculates a target position at which the DUT is located according to the measurement positions and the distances;
    wherein the mobile device is a notebook computer;
    wherein the notebook computer comprises an upper cover and a lower cover, and the second wireless communication module is disposed in the upper cover;
    wherein while the notebook computer is being opened, the distances are measured.

2. The positioning system as claimed in claim 1, wherein the sensor comprises a gyroscope, an electronic compass, or an accelerometer.

3. The positioning system as claimed in claim 1, wherein the mobile device obtains an RSSI (Received Signal Strength Indication) via the wireless connection at each of the measurement positions, and the processor calculates the distances according to the RSSIs.

4. The positioning system as claimed in claim 3, wherein the wireless connection is a Wi-Fi Direct connection.

5. The positioning system as claimed in claim 1, wherein the DUT further comprises a first sound module, the mobile device further comprises a second sound module, and the distances are measured by transmitting sound signals between the first sound module and the second sound module.

6. The positioning system as claimed in claim 5, wherein the first sound module is a speaker, and the second sound module is a microphone.

7. The positioning system as claimed in claim 5, wherein the distances are measured according to attenuation of the sound signals.

8. The positioning system as claimed in claim 1, wherein the processor calculates the target position according to the following equations:

$$\begin{cases} (x-x_1)^2 + (y-y_1)^2 = d_1^2 \\ (x-x_2)^2 + (y-y_2)^2 = d_2^2 \\ (x-x_3)^2 + (y-y_3)^2 = d_3^2 \end{cases}$$

wherein on a coordinate plane, (x, y) represents a coordinate of the target position, $(x_1, y_1)$ represents a coordinate of a first measurement position, $(x_2, y_2)$ represents a coordinate of a second measurement position, $(x_3, y_3)$ represents a coordinate of a third measurement position, $d_1$ represents a first distance between the first measurement position and the target position, $d_2$ represents a second distance between the second measurement position and the target position, and $d_3$ represents a third distance between the third measurement position and the target position.

9. The positioning system as claimed in claim 1, wherein when at least three different angles are formed between the upper cover and the lower cover, the distances are measured, respectively.

10. A method for positioning, comprising the steps of:
establishing a wireless connection between a mobile device and a DUT (Device Under Test);
moving the mobile device along a path which comprises at least three different measurement positions;
measuring a distance between the DUT and each of the measurement positions by the mobile device; and
calculating a target position at which the DUT is located according to the measurement positions and the distances by the mobile device;
wherein the mobile device is a notebook computer;
wherein the notebook computer comprises an upper cover and a lower cover;
wherein while the notebook computer is being opened, the distances are measured.

11. The method as claimed in claim 10, further comprising:
obtaining an RSSI (Received Signal Strength Indication) via the wireless connection at each of the measurement positions; and
calculating the distances according to the RSSIs.

12. The method as claimed in claim 11, wherein the wireless connection is a Wi-Fi Direct connection.

13. The method as claimed in claim 10, further comprising:
measuring the distances by transmitting sound signals between the mobile device and the DUT.

14. The method as claimed in claim 13, wherein the distances are measured according to attenuation of the sound signals.

15. The method as claimed in claim 10, wherein the target position is calculated according to the following equation:

$$\begin{cases} (x-x_1)^2 + (y-y_1)^2 = d_1^2 \\ (x-x_2)^2 + (y-y_2)^2 = d_2^2 \\ (x-x_3)^2 + (y-y_3)^2 = d_3^2 \end{cases}$$

wherein on a coordinate plane, (x, y) represents a coordinate of the target position, $(x_1, y_1)$ represents a coordinate of a first measurement position, $(x_2, y_2)$ represents a coordinate of a second measurement position, $(x_3, y_3)$ represents a coordinate of a third measurement position, $d_1$ represents a first distance between the first measurement position and the target position, $d_2$ represents a second distance between the second measurement position and the target position, and $d_3$ represents a third distance between the third measurement position and the target position.

16. A positioning system, comprising:
a DUT (Device Under Test), comprising a first wireless communication module; and
a mobile device, comprising a second wireless communication module, a sensor, and a processor, wherein the second wireless communication module comprises a first antenna and a second antenna,
wherein a wireless connection is established between each of the first antenna and the second antenna of the second wireless communication module and the first wireless communication module, and
wherein the mobile device is moved along a path comprising at least two different measurement positions, the sensor detects a relative relationship between the measurement positions, the mobile device uses the respective first and second antennas to measure a distance between the DUT and each of the measurement positions, and the processor calculates a target position at which the DUT is located according to the measurement positions and the distances;
wherein the mobile device is a notebook computer;
wherein the notebook computer comprises an upper cover and a lower cover, and the first antenna and the second antenna of the second wireless communication module are disposed in the upper cover, and there is a predetermined distance between the first antenna and the second antenna;
wherein while the notebook computer is being opened, the distances are measured.

17. The positioning system as claimed in claim 16, wherein the sensor comprises a gyroscope, an electronic compass, or an accelerometer.

18. The positioning system as claimed in claim 16, wherein the mobile device obtains two RSSIs (Received Signal Strength Indications) via the wireless connection at each of the measurement positions, and the processor calculates the distances according to the RSSIs.

19. The positioning system as claimed in claim 18, wherein the wireless connection is a Wi-Fi Direct connection.

20. The positioning system as claimed in claim 16, wherein when at least two different angles are formed between the upper cover and the lower cover, the distances are measured, respectively.

* * * * *